United States Patent
Boudville

(10) Patent No.: US 9,339,733 B2
(45) Date of Patent: May 17, 2016

(54) BARCODE-BASED METHODS TO ENHANCE MOBILE MULTIPLAYER GAMES

(71) Applicant: Wesley John Boudville, Perth, WA (US)

(72) Inventor: Wesley John Boudville, Perth, WA (US)

( * ) Notice: Subject to any disclaimer, the term of this patent is extended or adjusted under 35 U.S.C. 154(b) by 78 days.

(21) Appl. No.: 13/986,650

(22) Filed: May 22, 2013

(65) Prior Publication Data

US 2014/0349746 A1    Nov. 27, 2014

(51) Int. Cl.
  *A63F 13/31* (2014.01)
  *A63F 13/335* (2014.01)
  *A63F 13/30* (2014.01)

(52) U.S. Cl.
  CPC ............... *A63F 13/31* (2014.09); *A63F 13/30* (2014.09); *A63F 13/335* (2014.09)

(58) Field of Classification Search
  CPC .................. A63F 2009/242; A63F 2300/577; A63F 2300/305; A63F 13/12; A63F 13/86
  See application file for complete search history.

(56) References Cited

U.S. PATENT DOCUMENTS

| | | | |
|---|---|---|---|
| 6,280,323 B1* | 8/2001 | Yamazaki et al. | 463/4 |
| 8,348,149 B1 | 1/2013 | Boudville | |
| 8,554,836 B1* | 10/2013 | Wilson | G06Q 30/0214 709/203 |
| 2007/0072676 A1* | 3/2007 | Baluja | 463/42 |
| 2007/0087797 A1* | 4/2007 | Van Luchene | 463/1 |
| 2009/0042646 A1* | 2/2009 | Sarkar et al. | 463/29 |
| 2009/0111584 A1* | 4/2009 | Koplar | 463/42 |
| 2010/0082784 A1* | 4/2010 | Rosenblatt | H04L 12/2812 709/222 |
| 2010/0311483 A1* | 12/2010 | Fields et al. | 463/2 |
| 2011/0059786 A1 | 3/2011 | Walker | |
| 2011/0263333 A1* | 10/2011 | Dokei et al. | 463/42 |
| 2012/0045059 A1* | 2/2012 | Fujinami | H04L 9/0866 380/273 |
| 2012/0084131 A1 | 4/2012 | Bergel | |
| 2012/0136777 A1 | 5/2012 | Hanson | |
| 2012/0215637 A1 | 8/2012 | Hermann | |
| 2012/0290950 A1 | 11/2012 | Rapaport | |
| 2012/0295591 A1 | 11/2012 | Boudville | |
| 2012/0302024 A1 | 11/2012 | Guinn | |
| 2013/0053149 A1 | 2/2013 | Rouse | |
| 2013/0086465 A1 | 4/2013 | Boudville | |
| 2013/0116044 A1 | 5/2013 | Schwartz | |
| 2013/0117175 A1 | 5/2013 | Hanson | |
| 2013/0123019 A1* | 5/2013 | Sullivan et al. | 463/42 |
| 2013/0186954 A1* | 7/2013 | Denny | G06Q 10/107 235/375 |
| 2013/0252725 A1* | 9/2013 | Buhr | 463/29 |
| 2013/0260896 A1* | 10/2013 | Miura et al. | 463/42 |
| 2014/0004951 A1* | 1/2014 | Kern et al. | 463/42 |
| 2014/0031121 A1* | 1/2014 | Kern et al. | 463/33 |
| 2014/0094275 A1* | 4/2014 | Abouchar et al. | 463/25 |
| 2014/0187317 A1* | 7/2014 | Kohler et al. | 463/31 |
| 2014/0203071 A1* | 7/2014 | Eggert | G06F 17/30002 235/375 |
| 2015/0050998 A1* | 2/2015 | Stelovsky et al. | 463/31 |

* cited by examiner

*Primary Examiner* — Damon Pierce
*Assistant Examiner* — Anh Vo V Nguyen

(57) ABSTRACT

How do 2 people near each other and who have cellphones play a multiplayer Internet game? The first person visits it on her phone. She gets a barcode of an URL with an id of her Internet address. The second person images it with his phone and connects to the server. The server sends pages to both phones, to let them play the game. A barcode can add more people to the game. A player hands her character to a nearby person with a mobile device. Or to add watchers to follow the Point Of View of a player. A barcode can transfer assets between players, in a game that encourages physical proximity and enhanced social interaction. Another method of linking the players is where the phone emits a sound that maps to an URL. The other phone records and decodes the URL. It queries the server with the URL, to log the second person into the game.

15 Claims, 5 Drawing Sheets

BARCODE-BASED METHODS TO ENHANCE MOBILE MULTIPLAYER GAMES

TECHNICAL FIELD

The invention relates to the use of two or more cellphones to play a multiplayer game.

BACKGROUND

Jane and Bob are near each other. They have cellphones. They want to play a multiplayer game on their phones. The game is held on an Internet server. Suppose the game is played on phone browsers. How do they tell the server that they want to play the same instance of that game?

One class of solutions assumes that the phones have common or complementary hardware that enables a direct (and usually wireless) connection. Like Bluetooth, NFC, RFID or WiFi. Or infrared, where by this we mean the range of infrared wavelengths typically used for TV or garage door remote controls. Given one of these hardware choices, Jane makes a direct connection to Bob's phone, passing data which is essentially an identifier of her, already known to the server. Bob connects to the server, picks the game and passes Jane's id to the server. Jane connects to the server. The server sees that Jane and Bob are connected, and that they wish to play the game, so it serves pages for the game to their phones.

Another method does not use special hardware. Jane and Bob connect their phones to the server. So Jane might be listed on a "matchmaking lobby" that shows them and others willing to play that game. Bob then picks Jane from this list and tells the server. Which then serves pages for the game to their phones.

A simpler version of the previous paragraph is possible if Jane and Bob had earlier played the game together. Then Jane might have added Bob to a buddy list, where this is stored or known to the server. Now she connects to the server. She waits for Bob to connect to the server, if he has not already done so. She goes to her buddy list, picks Bob and tells the server to start the game between her and Bob. The server sees that they are both connected, and so serves pages for the game to their phones. Here Jane does not need to search through a possibly long list of currently connected people to find Bob.

Note that a server based game might use a matchmaking method that allocates incoming users to game sessions. The decision to assign a given user to a given game session is to minimise the overall latencies (delays) of users that are in the session. This assumes that users have no wish to play with specific other users.

SUMMARY

How do 2 people who are near each other and have cellphones play a multiplayer game? Where the game is hosted on a server on the Internet. The first person ("Jane") joins the game by visiting it on her phone. She gets a barcode on her phone from the server. The barcode encodes an URL with an id of her phone Internet address. The second person ("Bob") scans it with his phone's camera. His phone decodes the URL and connects to the server. The server enters Bob into the game. The server sends pages to both phones, to let them play the game.

The barcode can add more people to the game. Including where a player hands off her character to a nearby person with a mobile device. Or to add watchers to follow the Point Of View of a player.

The barcode can transfer assets between players, in a game that encourages physical proximity and enhanced social interaction.

Another method of linking the players is where after Jane enters the game, her phone emits a sound that maps to an URL. Bob's phone records and decodes it to the URL. His phone queries the server with the URL. He is then logged into the game.

The barcode mechanism can also be used for non-game purposes. Like a teacher distributing reading material or exams to her students. Or a supervisor keeping track of subordinates who will be moving in a region. Or a person conducting surveys.

DETAILED DESCRIPTION OF THE PREFERRED EMBODIMENT

Figure 1:
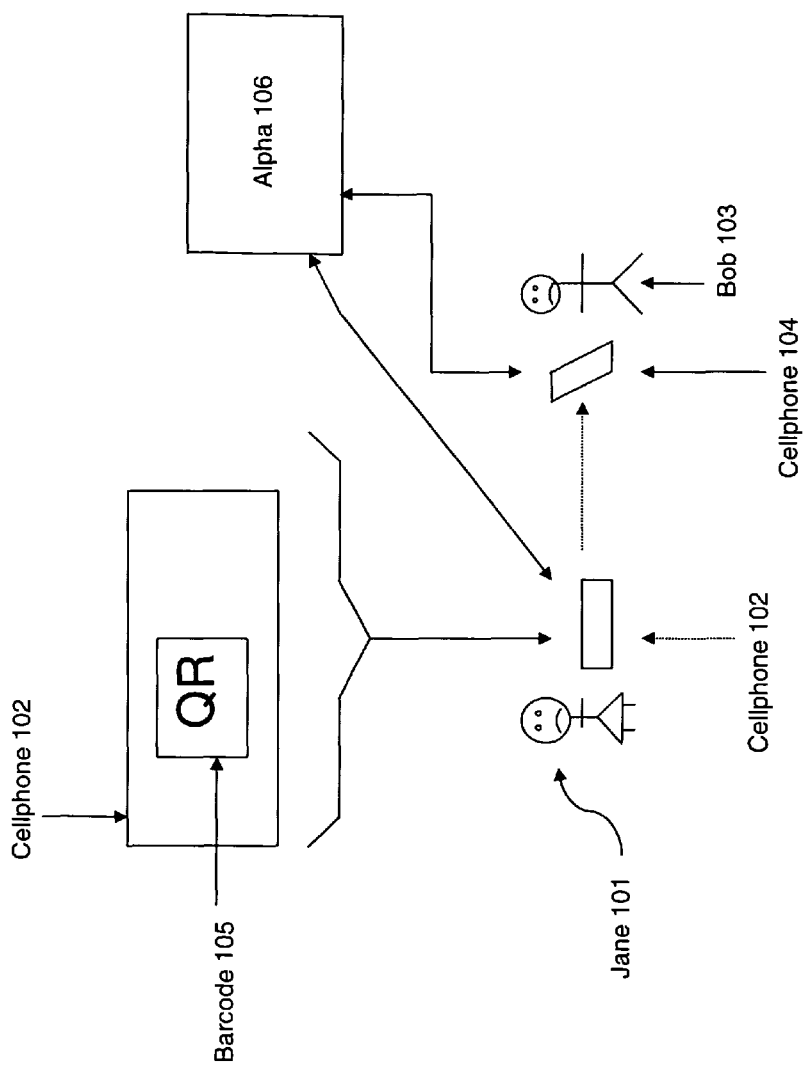
FIG. 1 shows Jane and Bob, with cellphones and near each other.

What we claim as new and desire to secure by letters patent is set forth in the following claims.

This submission refers to our earlier submissions to the US PTO: "Cellphone changing an electronic display that contains a barcode", filed 16 May 2011, US application 20120295591 ["1"]; "Using dynamic barcodes to send data to a cellphone", filed 28 Jul. 2011, U.S. Pat. No. 8,348,149 ["2"]; "Barcode and cellphone for privacy and anonymity", filed 4 Oct. 2011, US application 20130086465 ["3"]; "Colour barcodes and cellphone", filed 16 Dec. 2011, Ser. No. 13/374,207 ["4"]; "Uses of a projector phone", filed 6 Jan. 2012, Ser. No. 13/374,659 ["5"]; "Mobile device audio from an external video display using a barcode", filed 25 May 2012, Ser. No. 13/506,921 ["6"]; "Dynamic group purchases using barcodes", filed 29 May 2012, Ser. No. 13/506,957 ["7"]; "Chirp to control devices", filed 9 Oct. 2012, Ser. No. 13/573,823 ["8"].

We shall use examples of Internet Address version 4. The examples can be generalised to IPv6.

We will describe the use of 2 dimensional barcodes. Examples of these include QR and Data Matrix codes. But other types are possible, including 1 and 3 dimensional formats.

There will be various Universal Resource Locators (URLs) presented as pedagogic examples to clarify the narrative. These URLs are not "live". Copying any of these into the address bar of a browser will not yield any results pertaining to this submission. Rather, the base domain in the URLs, which will be termed "alpha.com", is a placeholder for some actual domain in a reduction to practice of this submission.

The submission has the following sections—
1: Main
2: Umpire
3: Add User
4: Hand off
5: Add Watcher
6: Single Player+Add Watcher
7: Add Umpire Watcher
8: Transfer Assets Between Players 9: Chirp
10: Extensions
11: Teacher, Supervisor, Tracker
12: Single and Mutual Tracking
13: Survey 1: Main WHY might Jane and Bob want to play the same game? Since the 1990s, multiplayer games have existed on the Web. These are often meant to be played on a desktop or laptop. Like chess. One attraction is that a player can play anyone else in the world. These are not in-person interactions. At most, there might be a text or audio or video channel where players can communicate with each other, concomitant with playing the game.

But it is also well known that social interactions are desired by many. The rise of cellphones, especially with high resolution colour screens and an Internet connection, has spawned many social web applications for the phone. So 2 people might meet in person and possibly want to play a multiplayer game. The attraction is comparable to how people still play board games like chess, checkers, Monopoly™ and Trivial Pursuit™. For all these examples, Web versions now exist but the original non-computer versions remain popular.

The problem is that letting 2 people near each other easily play a joint game on their phones is surprisingly difficult. The main utility of this submission is to describe a method to solve this problem.

The problem is ironic. Much of the last 40 years development of the Internet and the cellphone network has been to easily enable interaction between people in widely separated locations.

In the Background section, it can be seen that the custom hardware solution is limiting. If Jane, say, has Bluetooth hardware, then Bob needs Bluetooth hardware. Him having RFID hardware, for example, will not enable a direct connection. More to the point, consider what are currently termed smartphones, mostly made by Apple Inc. and Samsung Inc. There are about 130 million of these in the US. They do not usually have the necessary hardware for a direct connection.

It is possible for both persons to have custom hardware attached to their phones, for a direct wireless interaction. But this is extra cost and effort. It is especially unlikely if the users are not dedicated gamers.

The other method in the Background of both going to the server has the disadvantage of involving several manual steps. Suppose the server is at the domain Alpha.com. And that Jane has played the game before, so she might have bookmarked that domain or a page within that domain where the game ("Beta") is to be played. In general, Alpha could have several different games, single player or multiplayer. So these might be at different pages.

The point about bookmarking, for any bookmark, is to avoid having to type an URL. Especially on a phone, where this can be slower and more error prone than on a desktop or laptop.

Beta can be a proprietary game owned or licensed by Alpha, or a commonly known game, like chess, that is in the public domain.

Jane meets Bob. She persuades him to play the game. So with minimum manual effort, Jane connects to the game page at Alpha. Suppose Bob has never played any games at Alpha. He is unlikely to have bookmarked Alpha.com. He has to type it on his phone browser. Slow and error prone. Now suppose Beta exists at a lower level page. Bob has to find and press the appropriate links on Alpha's home page, to drill down to Beta's page. This picking of links (i.e. buttons) is easier than Bob having to type an URL will gets to the Beta page. But it is still manual steps.

Possibly if not probably Jane will have to manually instruct him.

Suppose for simplicity that there is no login required for Bob. Maybe the website lets all users or just new visitors play for free.

So Bob is now at the Beta page. This likely shows a list of people connected to Alpha, that want to play Beta with someone else. Especially if it is a popular game. This list would probably be of nicknames that those people assume when using Alpha. So Jane has to tell Bob her nickname. He searches the list for it. If the list is long because Beta is popular, he has to scroll through it. Or there could be a search box, where he types part or all of Jane's nickname. This is more manual effort by him and her.

For example, suppose Jane's nickname is "riotgurl2". She says it out loud to Bob, as "riot girl 2". But if Bob has to type most or all of it into a search box, or even if he is scrolling through a list of players, he needs to know some or all of the correct spelling. She has to spell it out. In this example, there are 2 ambiguities—"gurl" is pronounced "girl". And "2" is the digit and not the letters "two". While this example is fictional, it is not contrived. When people pick nicknames, like usernames in email addresses, the spellings can be intricate and counterintuitive.

The reader should appreciate that every manual step is a source of potential error and frustration. Ironically, the use of smartphones can increase the chances of typing errors. In the current meaning of "smartphone", this device has no manual keyboard. Typing is via a virtual keyboard on the screen. But the lack of tactile feedback can contribute to greater mistyping rates.

Assume Bob eventually finds Jane on the Beta page. He picks her, and Alpha starts the game on their phones.

An alternative to Bob searching a list of names for Jane might be where Alpha can access the locations of Jane's and Bob's phones. Then Alpha can arrange the list of users on Bob's phone to put Jane near the top. But this assumes that Jane and Bob both have phones with location ability and that they give Alpha permission to access it. Also, the most common location method uses GPS. This is not usually available indoors.

If it is desired that a game be widespread in its use, understanding the above asymmetry between Jane and Bob is important. Jane has played the game before and likes it, by assumption. Bob has no direct experience with the game. It is important to simplify his first experiences with the game. A bonus is that if Jane also has an easy time helping Bob into the game, then she might be more inclined to repeat this with other newcomers. Which spreads the popularity of the game.

Now suppose that Bob has played Beta before, but never with Jane. The difference with the above steps is that if he had bookmarked Alpha.com, or, better yet, the Beta page, he can go to one of these without typing. He still has to do the above manual steps to search for Jane, because she is not in his buddy list. By the latter, we mean a list, sometimes called a friends' list, of electronic addresses of people Bob has interacted with in the past, usually on this website, The list is typically held on the website's database.

This submission proposes a simple method that avoids the above issues. See FIG. 1. Jane 101 has Cellphone 102. Alpha 106 is the web server for Alpha, located on the Internet. She connects to the Beta page of Alpha 106 via her phone browser. She might perform some login steps, furnishing her username (this might also be called a nickname or handle or moniker)

and password. From this connection, Alpha knows the Internet Protocol (IP) address of Cellphone 102, by the lowest level properties of IP. On the Beta page is a button that makes Barcode 105 that will appear on a page in Jane's phone browser. Or, equivalently, Barcode 105 appears in a popup window of that browser or phone operating system. The barcode could encode an URL like "http://alpha.com/beta/10-20-30-40"

where here Cellphone 102 is assumed to have an IP address of 10.20.30.40. Or Alpha might instead keep an internal table that maps from a primary key value to 2 fields, where one field is Jane's username and the other field is her IP address. Suppose this primary key value is 15. Then instead of the above URL, the URL might be "http://alpha.com/beta/k=15"

where k is the name of this part of the URL. In general, for both these URL examples, there might be other fields, for other purposes.

Barcode 105 is shown as symbolically containing the label "QR". This is meant to suggest that the choice of barcode encoding is the QR code though other formats are possible.

Near Jane 101 is Bob 103 with his Cellphone 104, which has a camera (not shown). Bob takes a photo of Barcode 105. Cellphone 104 decodes it and connects to Alpha 106.

For the specific choice of QR barcodes, there are mobile apps available for free or nominal cost, for the iPhone™ and Android™ platforms, that Bob can use for decoding. To the best of our knowledge, similar QR decoders also exist for the Blackberry™ and Nokia™ platforms.

Note that the connections between Cellphone 102 and Alpha 106 and between Cellphone 104 and Alpha 106 are a combination of wireless and wired. The first connection between either of these to another device would be wireless. If say Cellphone 102 connects to the Internet via its phone carrier, then the first connection would be to the basestation of the carrier. Thence, the signal traverses the carrier's internal wired network. At some point there would be a gateway machine that connects to the Internet. Another method might be via a WiFi hot spot that Cellphone 102 uses. Where the WiFi has a wired connection to the Internet. Similar remarks can be made for Cellphone 104. For clarity in FIG. 1, these various networking machines are omitted.

When Alpha 106 gets the URL from Cellphone 104, the URL has the format as suggested by the earlier examples. The connection from Cellphone 104 to Alpha 106 inherently tells Alpha the Internet address of Cellphone 104, as was done earlier with Cellphone 102's connection to Alpha 106 to get its web pages. Hence Alpha 106 now knows the Internet addresses of both phones. It then sends each phone an appropriate web page to start the game.

Thus it can be seen that there is a feedback loop between Cellphone 102, Cellphone 104 and Alpha 106. All this only requires one initial imaging of a barcode on Cellphone 102. In general, the subsequent interactions between Jane and Bob playing the game on the phones will not need Cellphone 102 to show another barcode or for Cellphone 104 to take a photo of that barcode.

In submission "1", we described the base idea of such an automated feedback. There, instead of Cellphone 102 of our FIG. 1, there was a large electronic screen controlled by a computer on the Internet. The screen's computer would get instructions from a server on the Internet, to show a barcode on the screen. A user with a cellphone would scan the barcode and then get control of the large screen. The phone would act as the remote control of the screen.

There are similarities and differences with the current submission.

The differences are as follows.

The earlier submission used a large fixed screen. The current submission uses a cellphone. The much smaller size of the latter means that this screen is human portable; i.e. hand held. The main use cases of the earlier submission were for the big screen to be in a shop window or to be an electronic billboard in a fixed location. In submission "7" we generalised the latter billboard to be mobile in the sense of it being towed by a vehicle, or attached to the side of a vehicle. This is still different from the current idea of a cellphone being used as the screen.

The earlier submissions meant for the big screen to be viewable by several people. Perhaps many, like in a plaza below a billboard. The current submission has both phone screens being essentially single user viewable.

Another difference is that the earlier submissions had several users possibly being able to have portions of the big screen under separate control. This is not practical in this submission.

The earlier submissions had the user (or users) controlling the big screen being within line of sight. So that they could see the effect of their picking of various buttons on their phone web pages on the big screen. The current submission has the possibility that Jane and Bob might walk away from each other. While we discussed earlier how a motivation for this submission is that they want to jointly play a game while being nearby, some applications might find it useful for them to separate. In a game context, this could include scavenger hunts, where they split up to find clues.

Earlier, for simplicity, we omitted possible variant steps. For example, before Jane gets a barcode for her phone, she might fill out customising setup steps for the game she wants to jointly play with Bob. This might include whether she goes first or Bob goes first, or whether Alpha makes the choice for them. This refers to turn based games like chess.

Figure 2:
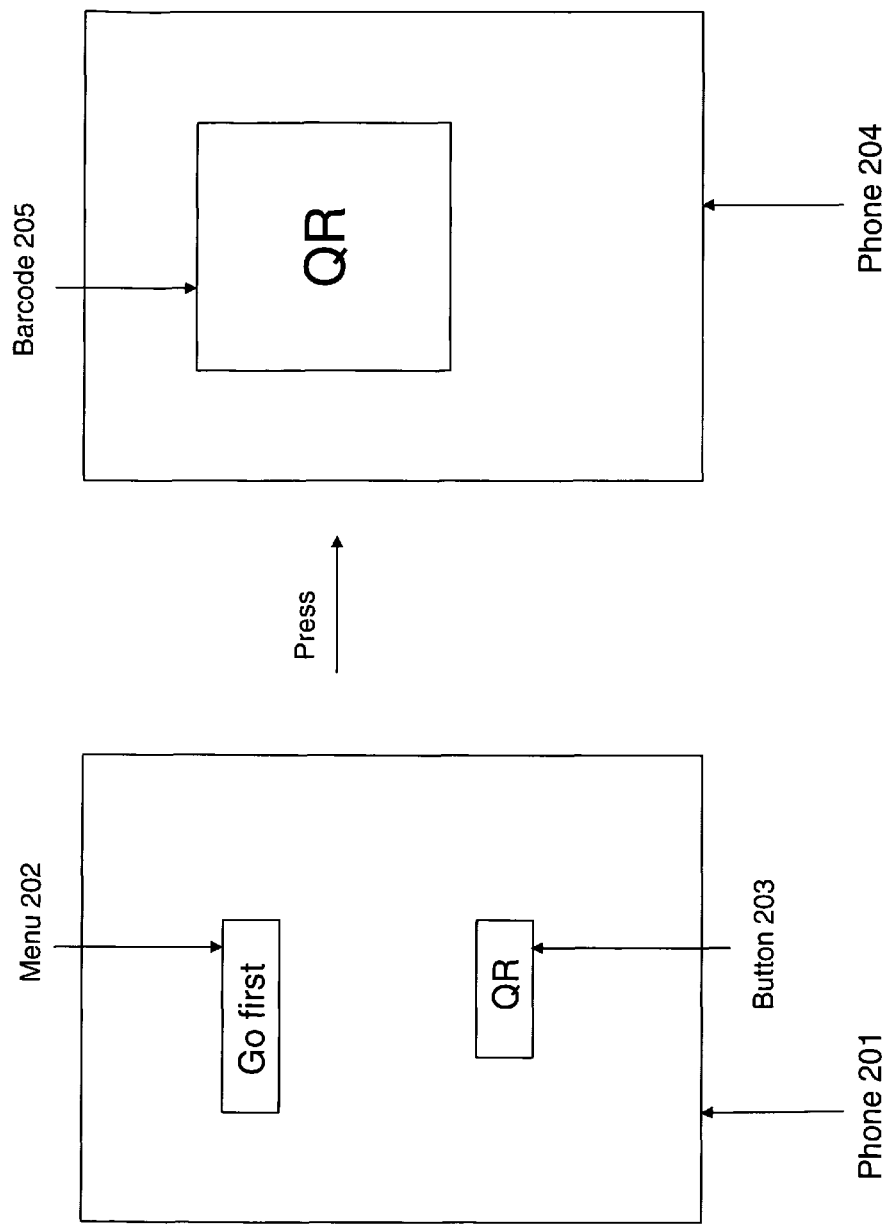
FIG. 2 shows Jane's cellphone, with widgets to add a person to the start of a game.

See FIG. 2. Phone 201 is Jane's phone. Menu 202 could have choices like "Go first" for Jane to move first in the game, or "Go second" for Bob to move first, or "random" for Alpha to randomly pick one of them to be first. The putting of these options into a menu is to avoid Jane having to type anything, which is slow and error prone.

Button 203 can be pressed by Jane to bring up a barcode that Bob can scan. The label "Press" in FIG. 2 indicates what happens. Phone 201 becomes Phone 204. In this is Barcode 205. The label "QR" inside Button 203 and Barcode 205 is meant to suggest the presence of a QR barcode. But other barcode encodings are possible.

The simplicity of FIG. 2 to Jane is an important utility of the submission. She has very little manually to do. And likewise Bob has essentially a one click imaging of Barcode 205 to join the game. This can help a new game virally spread.

Another possibility is that Jane might pick her character first, out of a range of roles offered in the game, like trader, sword fighter or magician. Depending on the game, this might or might not restrict the choices available to Bob. (Perhaps a game only permits one instance of a magician.)

Consider when Bob gets a web page from Alpha. He, like Jane, might want to customise his game settings or choices. Or suppose this is Bob's first time playing that game or any game at Alpha. Alpha might then ask or require that Bob provide some information about himself, like making choices of a username and password. And possibly furnishing a "real" name.

These factors can add to the delay before the game fully starts, when Alpha updates Jane's pages in part as a consequence of Bob's actions.

The steps described above have several advantages over existing methods. One is the minimum hardware. The cellphones need no specialised antennas. The cellphones themselves are Commercial Off The Shelf (COTS) hardware. Another is the essentially one click method for both persons of registering two players for a game. In other contexts of Web interactions, it is well known that fewer initial steps reduces errors and can improve the popularity of an application.

The steps objectively let Jane and Bob connect for a game. Earlier, we described how the current scenario can involve one player searching for the username of the other in a list that might be quite long for a popular game. It is far less cognitive effort for Bob to simply have his phone decode the barcode and get a web page for a game that is guaranteed to be only with Jane.

Consider a multiplayer game where there are more than 2 players. The method of this section can be extended to several cases. One is where Jane and Bob are near each other, and are the first two players to join the game. They do so as discussed above. The other players might and probably are remote, and they join via current methods in the state of the art. Or the other players are near Jane, but choose to join via current methods.

Another case is where Jane and a group of players, excluding Bob, join the game using current methods in the state of the art. They might in general all be in different locations. Then Bob is near Jane and he joins via the method of this section.

In other words, in a general multiplayer game, Jane and Bob might be the only 2 who join using barcodes.

More generally, any number of players in a multiplayer game might join using barcodes, to the extent that they are near a player.

2: Umpire

One variant is where Jane is the umpire for a game. The barcode she shows in her phone to nearby people lets them join the game. The feedback she gets in her phone from a given person scanning the barcode might include whether he correctly filled out any required form, and the contents of that form.

Her web pages could show the overall status of the game. For example, if the game is some kind of exploring by players of a virtual world, she could see a map of the players' locations and current activities. Whereas each player might typically be able to only see his own situation.

3: Add User

A player could have a button on his web page. It lets Alpha make a barcode on his phone that he shows to others, to enlist them. In the same way that Jane showed her barcode to enlist the second player. The barcode on his phone could refer to his Internet address. Allowing a feedback loop between his phone and the phone of another person who scanned his barcode.

There could be a game where the rules specify that a barcode on a player's phone can only be used to sign up one player. After which, the server removes the barcode by updating that player's phone web page. Or simply by ignoring any future web requests due to a decoding of that barcode. In such a game, a valid barcode might "travel" from the first player to the second player, who can then use it to recruit a third player, and so forth.

A variant on the previous paragraph is where a barcode can be used to sign up more than one player, up to some limit. After which, the barcode is removed or requests ignored.

4: Hand Off

Suppose Jane plays a multiplayer game as a regular player. She wants to stop. Bob is nearby and not in the game. He wants to take her place. She invokes an option on her web page to bring up a barcode. When Bob scans this, he assumes her place in the game. This could involve some extra registration steps for him to do.

There might be an extra option on Jane's phone at this point. She can exit completely from the game. Or she gets to just watch updates from her character, now controlled by Bob.

Or the options were in a web page on her phone, before she got a barcode from the server. She made a choice, then the barcode was shown on her phone.

Another variant is where Jane wants to transfer the game from one of her devices to another. She uses the barcode.

5: Add Watcher

Jane plays a multiplayer game. Bob is not playing. He wants to see the game from her Point Of View (POV). Because she is using a cellphone, it is awkward for her to continually and manually show Bob her small screen. Instead, she brings up a barcode. Bob scans it and gets web pages updated continually on his phone, that replicate what she is seeing. He cannot change or perform any actions on behalf of her character.

A variant on this is where Jane delegates some actions to him. Essentially, two persons control the character.

A variant on the previous paragraph is where Jane controls several characters or units. The latter term might be appropriate for war games, where Jane has an army made up of infantry and armour units. Sometimes if she has too many of these, being able to delegate control of some to Bob might be desirable.

The game might give Jane an incentive to have watchers. For each person she shows the barcode to, if that person becomes a watcher, her screen might indicate this, along with a total of how many watchers she has recruited. She might get an award, measured in the fictional currency of the game, or in other fictional assets of the game, per watcher. This is a feedback loop between her device and the watchers' devices. A game might award her extra "credits" if her watchers watch for a minimum duration.

This scenario is where the game considers it desirable to have spectators. Something currently awkward to implement with mobile games.

If watchers are allowed, the game might let them do so for free, but subject them to ads. In this sense, what a watcher who follows a given player sees can differ from that player's screen.

6: Single Player+Add Watcher

An important special case of the previous section is where the game is a single player game. With the added ability for the player to let others watch on their devices what she sees and does on her device.

Jane can enlist others as watchers at the start of the game or during the game. Using the barcode method. It would depend on the particular implementation or rules of the game whether she can do one or both.

If she enlists during the game, there might be a means of her temporarily suspending the game while she is showing the barcode to another person. This suspension could be of fixed duration, independent of her actions. Or it might be under her control. The latter lets her instruct the watcher about any details of the game or of her planned future actions. To bring the watcher up to speed, especially if he has never played the game.

Or the suspension lasts till the watcher sends a query to the server and the server sends a page to the watcher. Possibly with some default extra grace time after the latter event happens, to let the watcher get his bearings.

The game might show an alert signal to the player or the watcher, indicating that the suspension will be ending.

When the game restarts, or if the game has been going continuously, there could be other types of information sent to the watcher device, other than just the visual information in the pages. This includes any audio that Jane gets.

Or suppose that the game sends Jane other types of data. Like making Jane's device vibrate when her character is hit by enemy projectiles. This data could also be sent to the watcher device.

Jane might be able to control whether the watcher gets these other types of data. This control could be done before she shows a barcode to Bob. Suppose she made some restrictions on the data sent to Bob. When Bob is later watching the game, Jane might be able to change those restrictions.

We described at the start of this section that the watcher gets to see and hear what Jane experiences on her device. This can be generalised, apart from the exceptions mentioned in the previous paragraph. For example, consider any textual data that Bob gets in his device. Imagine that Jane sees on her device a data feed with various information, like the numbers and types of units she has, and their abilities (as in a war game). Bob might be able to change some of the labels to be in a different language than what Jane sees.

Imagine that the games can be divided this way. Into games where there is just one character, in a role playing scenario. Another type would be where Jane controls several of these. Another is where Jane is the commander of military units in a war game. For the second type, Bob might be able to look at the POV of a character, separately from the POV that Jane is currently looking at. For the third type, Bob might be able to look at data screens different from those Jane is currently looking at. The first type might be where there are the most restrictions on what Bob gets on his device.

The game could also let Bob offer feedback via his device to Jane. While Bob had to have been near Jane at the start, to scan her barcode, the game does not have to assume that they will remain in proximity. The feedback could be in the form of (short) text messages, or perhaps audio. Audio might be attractive as more likely to get Jane's attention, especially if the game is a "twitch" (shooter) game. This increases the social interactivity of the game, even for an ostensibly single player game.

Jane might have the ability to turn on or off this feedback from Bob. This could be fine grained. For example, she will accept only text messages from Bob and not audio messages.

The game could impose a cost (i.e. a fee) on Jane or Bob, for sending such messages. The cost might be greater for audio than text.

If there are several watchers, they could be able to send messages to each other. These watchers might include those who have always been remote from Jane during the game. They signed up as watchers by means external to this submission, that did not involve barcodes.

The remote watchers might be doing so on mobile devices or on laptops or desktop devices.

The case of a single player game is important also because such games are still the most common type of computer games. It is more complex to code a multiplayer game. Modifying an existing single player game to use the methods of this submission can be quicker and cheaper than for a multiplayer game. It lets a game developer rapidly add a social component.

7: Add Umpire Watcher

Jane is the umpire. She sees the entire game. Bob is not playing. He wants to see what she sees. She makes a barcode that he scans. The pages he gets are umpire level pages. Where he cannot alter any settings, apart from varying his views.

A variant is where Jane delegates some umpire tasks to Bob.

Figure 3:
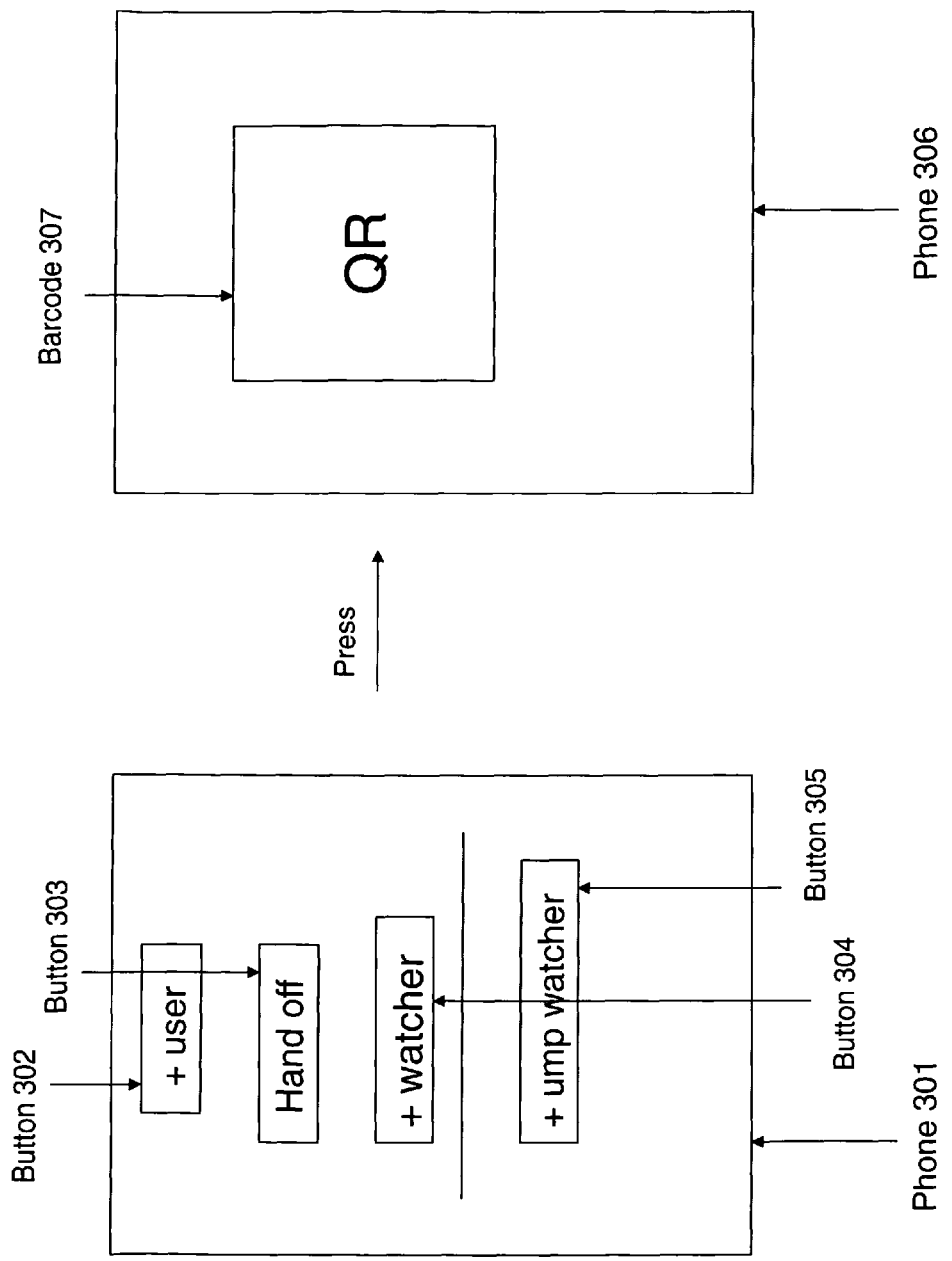
FIG. 3 shows Jane's cellphone, with widgets to add a person to a game in progress.

FIG. 3 shows an implementation of Sections 2-7. Phone 301 is Jane's cellphone. It shows a web page that she brought up while in the game. The page has buttons to let her do the actions ascribed to her above. Button 302 has the label "+user" and corresponds to Section 3—Add User. Button 303 has the label "hand off" and corresponds to Section 4—Hand off. Button 304 has the label "+watcher" and corresponds to Section 5—Add Watcher. Button 305 has the label "+ump watcher" and corresponds to Section 7—Add Umpire Watcher. In general, Button 305 will only appear if Jane is the umpire. While the other buttons will appear if Jane is a regular player. They might also appear if Jane is the umpire. Whether this happens depends on the rules of a given game.

In the depiction of Phone 301, the buttons would appear in a browser page or a browser pop-up. Also, in general, the web page in Phone 301 will have other labels and buttons and links. Including probably a button or link that lets her remove the displayed page and return to whatever view of task she was previously doing. These have been omitted from the figure, for clarity.

If Jane presses one of the depicted buttons, then her phone becomes Phone 306 and shows Barcode 307. This has the symbolic label "QR", to suggest that a QR code is shown. In general, it could be any type of barcode. The specific meaning of Barcode 307 depends on which button was pressed in Phone 301. Bob then scans Barcode 307 as described above.

The label "Press" over the arrow from Phone 301 to Phone 306 is meant to indicate a transition triggered by the pressing of a button in Phone 301.

The depiction of the various buttons in Phone 301 is only one possible implementation of the steps in the previous sections. Other implementations are possible.

8: Transfer Assets between Players

Thus far all the uses involved enlisting another person who is not currently in the game, to be an active player or a watcher. But another use is for the transfer of information or assets from one player to another.

A game could deliberately allow or even require that if a player can give or exchange assets with another player, then this transfer must be done in person, with the mechanism of this section. Instead of doing this purely electronically via their computers. One purpose is that the game could deliberately encourages a social aspect. Also, and this is the overlap with this submission, the movement of assets is done via a barcode shown on the mobile device.

For example, Bob might be willing to pay 100 gold coins (i.e. paying in the currency of the game) for a dagger that Jane has.

Suppose Jane wants to do this. She meets with Bob. Previously they negotiated, but did not transfer, an exchange of assets, while not in proximity (using some electronic network to do the negotiations). Or they have done this negotiation verbally while in earshot. Jane brings up a web page in her device, that comes from Alpha. In this page, she makes details of the assets to be shifted between her and Bob. She presses a button on the page. A barcode appears, encoding an URL that points to the details of this transfer. Bob scans the barcode. His device decodes it and contacts Alpha. Alpha sees that it comes from Bob's device.

This is two factor authentication. (Or at least a weak form of it.) Since Alpha made the original URL and sent it to Jane's device, and now got it back from Bob's device, it can suggest that both players agree. So Alpha transfers the assets on its database and updates the pages on their devices to tell them of this. More elaborate measures could be taken, to ensure that both players consent to this exchange.

The transfer might be one way. Like the passing of a clue or token from Jane to Bob. The item, while albeit it exists in digital form on Alpha's computer, can be akin to the baton in a relay race that must be handed from player to player.

Note that for whatever is transferred, the actual URL might have just an id that points to the details of the transfer. Alpha can keep internally a mapping from the id to the details. This allows for a compact URL.

Figure 4:
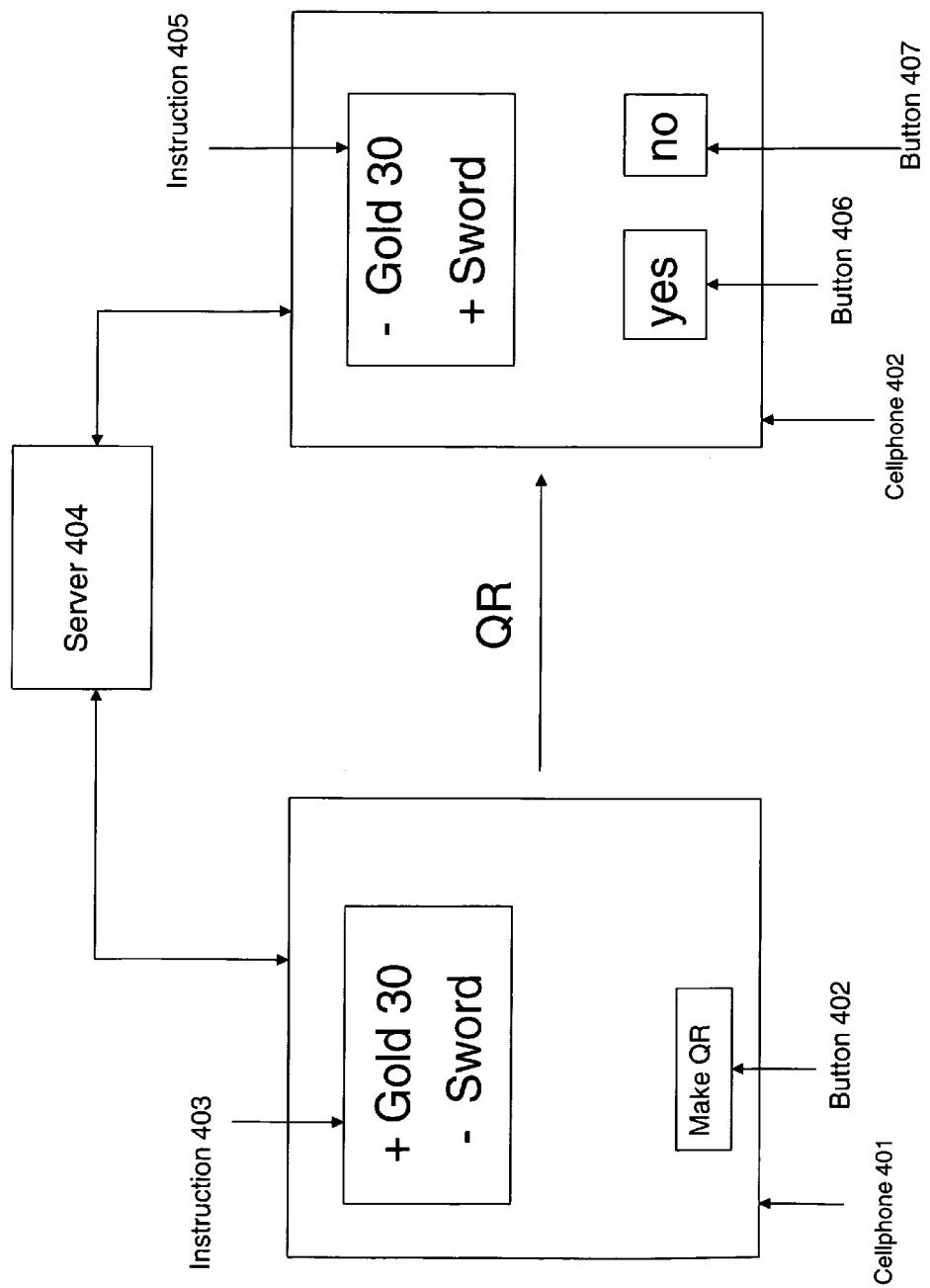
FIG. 4 shows an asset transfer between Jane and Bob.

FIG. 4 shows an implementation. Cellphone 401 is used by Jane. Cellphone 402 is used by Bob. The user interface on Cellphone 401 lets Jane make Instruction 403. This shows her willing to sell a sword and she wants in return 30 gold pieces. When she has made Instruction 403, she presses Button 402, to upload it to Server 404. The latter stores the instruction and returns a barcode to Cellphone 401, that encodes an identifier to the instruction. The barcode is shown on the screen of Cellphone 401, though this is not depicted in FIG. 4, for brevity.

The label "QR" on the arrow from Cellphone 401 to Cellphone 402 is meant to suggest the scanning of the barcode by Cellphone 402. The "QR" suggests the choice of the QR code. When Cellphone 402 decodes the barcode, it contacts Server 404, which returns Instruction 405. Note that this is shown in inverted signs from Instruction 403, to conform to Bob's viewpoint. If he approves the transfer, he presses Button 406 ("yes"). This tells Server 404 to do the asset transfer. If Bob disapproves, he presses Button 407, which tells Server 404 not to do the transfer.

There could be extra conditions attached to the transfer. For example, Alpha might require that one or both of Jane and Bob's devices tell it their locations. The latter could be found by GPS or other means external to the submission. The game might impose a condition that the transfer happen in a given location, like a particular coffeehouse. Or in one instance of a type of such locations, like any Starbucks™ store.

When the clue is transferred, it could typically mean that Jane no longer has it as part of her inventory on Alpha.

Another type of interaction might be the transfer of information where, when Bob gets the information from Jane via the barcode, she still retains a copy of it on Alpha.

The game could require or allow that Jane can make information on her phone, and then pass it to Bob via the barcode. Here, the information might not exist on the server. So it is entirely encoded in the barcode. The encoding could include an identifier of Jane's device or character. When Bob's device decodes the barcode, the game might have a step where Jane's identifier is uploaded from his device to the server. Telling it that some information came from Jane to Bob via a barcode. The game could have an incentive for Jane and Bob to collaborate in this interaction.

Once Bob has decoded the information, it can either be kept solely on his device, or a copy is uploaded to the server.

A variant is where Jane's information is encrypted by her and uploaded to the server. Where the server cannot decrypt it. The server returns an identifier of the data and this is encoded in the barcode.

Note that this section is qualitatively different from the earlier sections. Those assumed the enlisting was of a person not in the game. So the methods of the earlier sections might be fewer and easier to manually perform than any alternatives currently known. However that might not be true of this section. If two persons are already in the game, then it may be quicker for them to find each other directly through the pages or screens of the game (assuming that the game allows this).

Most games only have a few players, so searching this small set is far easier than, say, Bob wanting to play Jane and having to search a long list of all persons waiting to play, looking for Jane's username. The only major exception is when a game is a Massively Multiuser game. Where the number of players can be in the thousands.

Hence the advantages of the earlier sections are largely independent of the details or motivations of any multiplayer game. But the method of this section is appropriate to be used when a given game has as one of its motivations to encourage a proximity based social interaction between its players.

In this section, a preferred implementation is that the interaction ("transaction") be non-monetary. None of the assets transferred between the players are money. Some assets might have names or properties evocative of money (like "gold coins" or "treasure"), but these are simulations that exist in the game environment.

The players might have paid actual money to participate in the game. This could have included purchasing some or all of the game assets assigned to a player. But we regard that as external to this submission.

9: Chirp

Another variant does not use the display of a barcode. We extend our submission "8". It described the use of a "chirp"—A brief sound that evokes birdsong. (Hence the name chirp.) A phone emits this. The sound encodes a hash. Another nearby device that can record audio captures the sound. In practice, this device is another phone. The second phone is assumed to have an Internet connection. It decodes the chirp, where this requires the phone connecting to a known address on the Internet. At that address is a server that maps from an input hash to the data that the hash was made from. See "8" for more details. The data might be an URL. The phone then connects to that URL.

Figure 5:
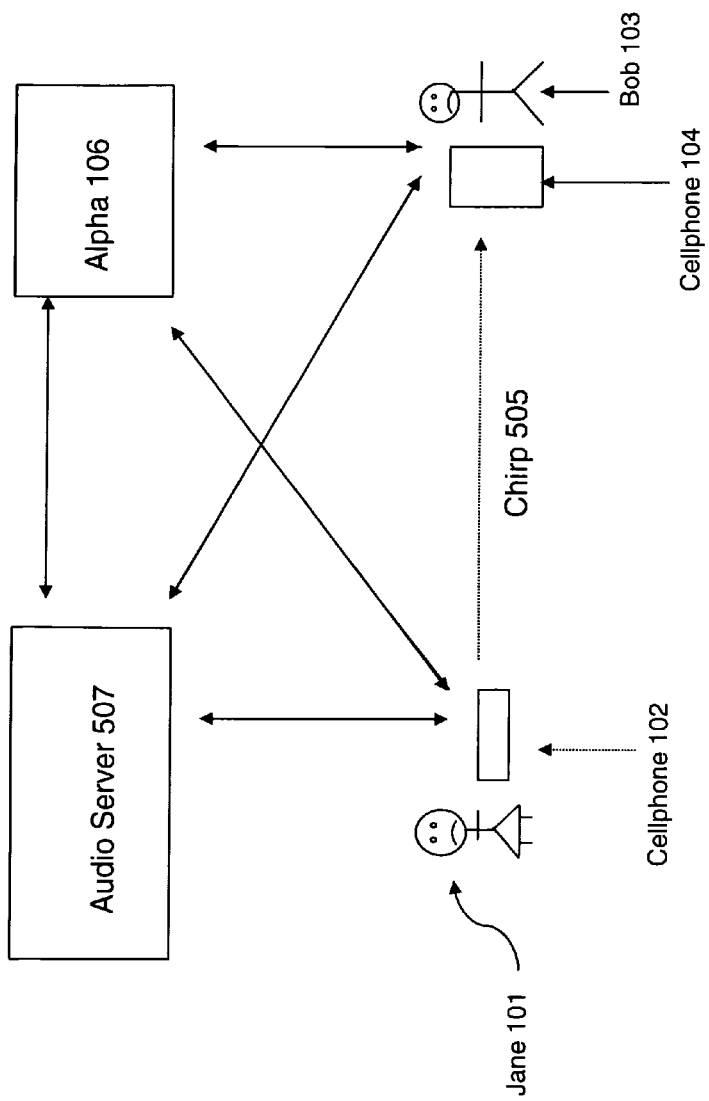
FIG. 5 shows the cellphones interacting using sound.

See FIG. 5. The elements Jane 101, Cellphone 102, Bob 103, Cellphone 104 and Alpha 106 are the same as in FIG. 1. Cellphone 102 asks Alpha 106 for a chirp. Alpha 106 makes an URL which it sends to Audio Server 507. This makes Chirp 505, which is sent either directly to Cellphone 102 or to Alpha 106. If the latter, then Alpha 106 sends Chirp 505 to Cellphone 102. Cellphone 102 emits Chirp 505. This might be done as an omnidirectional emission. Or Jane 101 might orient Cellphone 102 to direct the output in the direction of Bob 103 and Cellphone 104.

When Cellphone 104 gets Chirp 505, it asks Audio Server 507, which decodes it to an URL. Audio Server 507 can then return the URL to Cellphone 104, which sees the address of Alpha and asks Alpha 106 for the web page for that URL. Or Audio Server 407 sees the address of Alpha in the decoded Chirp 505. Audio Server 507 sends the URL to Alpha 106, along with the Internet address of Cellphone 104. Alpha 106 then sends the web page to Cellphone 104.

In the present submission, the first phone is part of a feedback loop. A successful decoding of the chirp by the second phone causes the web server to update the page on the first phone, as well as of course changing the page on the second phone.

Hence a chirp can be used to register 2 people for the same game.

The use of a barcode or a chirp does not have to be exclusive. For example, in FIG. 2, next to Button 204, there might be another button, perhaps labelled with a symbol like a musical note, indicating chirp. If Jane presses this button, her phone makes a chirp.

10: Extensions

The preceding steps used cellphones. A variant is where one or more of these is replaced by other mobile devices, like a tablet, notebook, netbook or laptop. Note above that the first player, Jane, did not need a camera on her cellphone, though it likely in fact would have a camera. Similarly if another device is used in place of a cellphone, it might or might not need a camera, depending on the role it plays in the submission.

In some usages, a mobile device might have a wired connection to the Internet.

Another variant is where a non-mobile computer is used. Like a desktop computer.

The methods of the earlier sections can be used independently of each other. For example, if the method of the first section is used to let people easily join a game, there is no requirement that the methods of any later section be used. Also, if the method of the first section is not used, then a method of a later section can be used; e.g. to add a watcher.

When the server is asked by a user's device for a barcode, the server might associate an expiration timestamp with the barcode. This need not be encoded in the barcode. In the web page returned to the requesting device, that contains the barcode, the timestamp could be written. It can be a requirement that the barcode is used before the time on the timestamp.

We described the use of this submission for multiplayer games. It can be extended to any type of mobile multiuser, browser based interaction. By the definition of browser based, there is a web server that writes web pages for the users' phones.

In turn, this can be extended to non-browser based multiuser applications. There is a common application installed on the users' phones. Each instance of the application communicates with a server, where the server typically controls a database. And where all the applications talk to the same server.

A user, Jane, who wants to use the application with several other users in her vicinity, starts it. She picks an option within the application that brings up a barcode, after the application connects to the server. The barcode encodes the web address of her phone, or a key to it, in the manner described earlier. Bob nearby takes a photo of the barcode. Either the application on his phone is able to decode the barcode from the captured image, or it connects to another application on his phone. Where the latter decodes the image. In either case, an application contacts the server with the decoded URL. It can be seen that this largely follows in all essential aspects the browser based methods used earlier.

There is one possible minor variant of the previous paragraph. In the original browser based methods, the data encoded in a barcode was an URL, that pointed to the server at, say, Alpha.com. Now, the application installed on Jane's and Bob's phones can already know the server address, before any barcodes are made or imaged. This can be read from a configuration file when the application starts, or it is embedded in a hardwired manner in the application itself. Thus the data encoded in the barcode need not be an URL. It can just be a key, that the server can use to map to Jane's phone Internet address. Where the server has stored the latter address when Jane's application contacted it.

Note also that the connection made by Jane's phone application to the server need not be http or https. It can be any type of valid Internet protocol. Ditto for the later connection made by Bob's phone.

It is possible for a mobile device to have a public IP address. Specifically for cellphones in the US, several cellular carriers offer this. If a phone has such an address, it can be directly contacted on the Internet. Mobile multiplayer games are possible under a p2p architecture, where p2p means peer to peer or phone to phone. Here, the phones are considered to have equivalent functionality for the purposes of the game. Or, one device might act as a super peer. Having more bandwidth or storage or computational power, that lets it act somewhat as a server for the other devices. In any of these cases, the game might enlist players via the barcode method, when two or more players are in proximity.

11: Teacher, Supervisor, Tracker

We describe several other use cases. One is where Jane is a teacher and Bob and others are her students. She uses her device to show a barcode that Bob et al can scan. When a student (Bob) does this, he gets a window on his device that is the start of a lesson. This window can be a browser or a window of an application already installed on his machine. He might have to do a login.

Jane's device can get feedback from the server about the status of each student. Like whether they have successfully logged in and, assuming so, where they are in the lesson.

The lesson could have various tasks that the reader has to complete, where this involves a transmitting of the student's actions to the server. The tasks might be tests of the content that he has read.

What is new here is the mechanism of the barcode (or of a sound) as the distribution mechanism from the teacher to the student.

Another case is where Jane is a supervisor and Bob and others report to her. Specifically, when Bob scans the barcode (or decodes the sound), the web page or application on his device periodically sends the coordinates of the device to the server. This assumes that his device has some capability like GPS. It could be a condition of his employment that he sets his device to give the appropriate permissions for this uploading of his location.

There might also be other information periodically uploaded from his device. Like photos taken by him, or other data. Where the latter could be from specialised sensor hardware attached to his device.

This could be used in contexts where Jane's subordinates are expected to move on their own through some region and do some actions.

It addresses one longstanding problem. In various urban regions, people are employed to distribute flyers to the doorsteps or other locations (like car windscreens) in a neighbourhood. A supervisor recruits several people for this. The people are not under direct supervision from her.

A lazy employee could just dump some or all of the flyers and later tell her that he did his job.

Traditionally, the supervisor might spot check the neighbourhood after the employee had presumably gone through. Sometimes nowadays, the supervisor will ask the employee to take photos of various locations he has been at, where the photos would show the flyers he left there.

In contrast, this submission is an operationally simpler way for the supervisor to impose a tracking of the employees. It does not require much in technical skills from the supervisor or the employees. And it is easier on the employee than having to periodically take photos.

While the method does not prove per se that the employee distributed the flyers, it forces him to walk a trajectory through the neighbourhood akin to a space filling curve in mathematics. If he has to expend this effort, then the extra manual effort to put out the flyers is relatively small.

12: Single and Mutual Tracking

A variant on the tracking of the previous section is where one of Jane and Bob does a tracking of the other. When they are near each other, Jane shows the barcode so that the server can associate her device and Bob's device. Once this happens, then one of these devices can be programmed to regularly reveal its location to the server, which then passes that to the other device. The latter device then shows the location of the first device on a map.

Another variant is where Jane and Bob do mutual tracking. When they are near each other, Jane shows the barcode so that the server can associate her device and Bob's device. The devices are regularly polled by the server, or they regularly push to the server, their coordinates. Then Jane's device shows on its screen a map where Bob's location is indicated. And likely also her location. With equivalent remarks for Bob's device.

13: Survey

Another common task that could use this submission is the conducting of manual surveys or opinion polls. By this we mean where a person, Jane, meets someone else, Bob, in person, and persuades him to take a survey. In general, she is expected to find as many of these people as possible.

If the survey is conducted by Bob going online to a website and filling out a form there, then this should be made as easy as possible. The mechanism where Jane shows Bob a barcode and he scans it is simpler and less error prone than him typing a web address. Especially because unlike the context of playing a game, he cannot be expected to have bookmarked that address.

Also, having feedback between Jane's device and Bob's device gives more information to Jane. She can find out how successful Bob is. The page on Bob's device can let him contact her with questions. She can maximise the number of correct respondents. This is good incentive for her, especially if she is being paid according to such a metric.

I claim:

1. A method for connecting two or more users with devices to a game hosted on a server on the Internet, comprising:
    providing a device for each user;
    providing the server, wherein the server is configured to provide information to the devices of each user via the Internet;
    contacting the server, by a first user through a web browser of a first device, to initialize an instance of the game to be played, the server in return providing a barcode that encodes an identifier of the first device;
    displaying the barcode on the web browser of the first device;
    image capturing the barcode, by the one or more other users using camera of their respective devices;
    decoding the barcode by the one or more other users using their respective devices;
    contacting the server, by the one or more other users using their respective devices, the server in return providing information related to the game;
    entering the game, by the one or more other users through web browser of their respective devices, using the information related to the game;
    providing a replacement means for replacing a retiring user in the game with a replacement user, the replacement means comprising:
        providing a replacement barcode to a retiring user when the retiring user contacts the server;
        displaying the replacement barcode on a web browser of the retiring user's device;
        imaging the barcode by camera of a device of a replacement user to obtain information about the retiring user's game; and
        transferring control of a character in the game from the retiring user to the replacement user.

2. The method according to claim 1, further comprising providing the first user and the one or more other users with one or more custom options to be selected prior to starting the game, the one or more custom options comprising: assigning characters to each user; assigning control of each character to particular users; assigning turns for each user; and selecting roles for each user from a plurality of roles.

3. The method of claim 2, wherein one of the roles of the plurality of roles is an observer, wherein the observer is configured to see assets and actions within the game but has limited or no control over the game.

4. The method of claim 1, wherein the barcode is a QR code.

5. The method of claim 1, wherein the barcode is a Data Matrix code.

6. The method of claim 1, wherein the first device is a cellphone and the devices of the one or more other users are cellphones.

7. The method of claim 1, further comprising providing a recruiting means for adding users once the game has been set up via a recruiting user, the recruiting means comprising:
    providing a means for contacting the server on the recruiting user's device;
    the server, in response, returning a barcode that encodes an identifier of the recruiting user's device;
    displaying the barcode on the web browser of the recruiting user's device;
    image capturing the barcode, by the one or more other users using camera of their respective devices, who are interested in joining the game;
    decoding the barcode on one or more other devices to obtain server information related to the game;
    contacting the server, by the one or more other devices, with the obtained server information; the server returning information related to the game; and
    entering the game, by the one or more other users through web browser of their respective devices, using the information related to the game provided by the server.

8. The method of claim 7, wherein the means for contacting the server comprises a button or a link on the recruiting user's device.

9. A method for connecting two or more users with devices to a game hosted on a server on the Internet, comprising:
    providing a device for each user;
    providing the server, wherein the server is configured to provide information to the devices of each user via the Internet;
    contacting the server, by a first user through a web browser of a first device, to initialize an instance of the game to be played, the server in return providing a barcode that encodes an identifier of the first device;
    displaying the barcode on the web browser of the first device;
    image capturing the barcode, by the one or more other users using camera of their respective devices;
    decoding the barcode by the one or more other users using their respective devices;
    contacting the server, by the one or more other users using their respective devices, the server in return providing information related to the game;
    entering the game, by the one or more other users through web browser of their respective devices, using the information related to the game;
    adding observer means for adding observers once the game has been set up, via an in-game user within the game, the adding observer means comprising:

providing a means for contacting the server on the in-game user's device, the server, in response, returning an observer barcode that encodes an identifier of the in-game user's device;

displaying the observer barcode on a web browser of the in-game user's device;

imaging the observer barcode, by the one or more other users, using camera of their respective devices, who want to join the game as observers;

decoding the observer barcode on the one or more other devices to obtain server information related to the game;

contacting the server, by the one or more other users using their respective devices with the obtained server information, the server returning information related to the game;

entering the game, by the one or more other users through web browser of their respective devices, using the information related to the game; and providing the one or more other users with information related to the in-game user comprising: the in-game user's point of view, audio and updates relating to the in-game user's character(s).

10. The method of claim 9 further comprising providing an option by the in-game user to allow limited control of the game by one or more of the other users who were added via the adding observing means.

11. The method of claim 9, wherein the server is configured to provide in-game ads for the one or more other users who were added via the adding observing means.

12. The method of claim 9, further comprising providing the in-game user with a suspension period of time or pause while adding the one or more other users via the adding observing means.

13. The method of claim 9, further comprising providing in-game feedback means whereby the in-game user or one or more other users can communicate with each other within the game.

14. The method of claim 13, wherein the in-game feedback means comprises options for the in-game user to turn on/off or restrict feedback from one or more other users.

15. The method of claim 9, wherein the means for contacting the server comprises a button or a link on the in-game user's device.

* * * * *